US011976756B2

(12) United States Patent
Thurston et al.

(10) Patent No.: US 11,976,756 B2
(45) Date of Patent: May 7, 2024

(54) COUPLING ASSEMBLY AND METHOD FOR RETROFITTING A PIPE

(71) Applicant: SETBC, LLC, San Diego, CA (US)

(72) Inventors: Edwin Thurston, San Diego, CA (US); David Burney, Ramona, CA (US)

( * ) Notice: Subject to any disclaimer, the term of this patent is extended or adjusted under 35 U.S.C. 154(b) by 24 days.

(21) Appl. No.: 18/122,687

(22) Filed: Mar. 16, 2023

(65) Prior Publication Data

US 2024/0093811 A1    Mar. 21, 2024

Related U.S. Application Data

(60) Provisional application No. 63/408,041, filed on Sep. 19, 2022.

(51) Int. Cl.
*F16L 19/02* (2006.01)
*F16L 21/06* (2006.01)

(52) U.S. Cl.
CPC .......... *F16L 19/0206* (2013.01); *F16L 21/06* (2013.01); *Y10T 29/5367* (2015.01)

(58) Field of Classification Search
CPC ...... F16L 9/0206; F16L 21/06; Y10T 29/5367
USPC .......................................................... 138/109
See application file for complete search history.

(56) References Cited

U.S. PATENT DOCUMENTS

| 9,188,269 | B2 * | 11/2015 | Hairston | B29C 63/34 |
| 9,851,035 | B2 * | 12/2017 | Hunt | F16L 37/133 |
| 2002/0033604 | A1 * | 3/2002 | Minemyer | F16L 17/04 |
| | | | | 285/373 |
| 2010/0102552 | A1 * | 4/2010 | Lockhart | B29C 48/34 |
| | | | | 156/149 |
| 2017/0291717 | A1 * | 10/2017 | Irwin | F16L 25/026 |
| 2021/0278021 | A1 * | 9/2021 | Chung | F16L 25/06 |

* cited by examiner

*Primary Examiner* — David R Deal
(74) *Attorney, Agent, or Firm* — Barcelo, Harrison & Walker, LLP (57) ABSTRACT

A coupling assembly and method for retrofitting a water pipe for installation of a pipe insert or device is disclosed. The coupling assembly may include a plunger assembly, a two-part clam shell, an adapter port, and an internally ribbed flexible sleeve including first internal ribs and second internal ribs, wherein the first internal ribs are configured to engage a grooved portion of the adapter port. Prior to installation, a first portion of the internally ribbed flexible sleeve may be attached to the adapter port and a second portion of the sleeve may be rolled up over the first portion. The method may include aligning the port adapter with the cut water pipe; rolling the second portion of the sleeve from the port adapter onto the cut pipe; placing a two-piece clam shell over the sleeve; and tightening two oppositely treaded nuts over the two-piece clam shell.

9 Claims, 6 Drawing Sheets

COUPLING ASSEMBLY AND METHOD FOR RETROFITTING A PIPE

CROSS REFERENCE TO RELATED APPLICATIONS

This non-provisional patent application claims priority to provisional U.S. patent application 63/408,041 filed 2022 Sep. 19, incorporated by reference herein.

TECHNICAL FIELD

This disclosure is generally directed to a coupling assembly, and more particularly to an assembly for retrofitting a pipe with a port adapter.

BACKGROUND

Most commercial and residential properties have a main, metered water pipe, which may be referred to as the main "line." Having a manually-adjustable flow restriction on the main line is not uncommon, but automatically or remotely adjustable flow restrictions may provide desired additional functions. For example, it may be beneficial for commercial and residential property owners to install a device (e.g., an automatic or remotely controllable valve and/or flow or pressure sensors) onto an existing water line to measure, monitor, limit, or adjust a flow of water in that line. However, it may be difficult to retrofit new devices onto existing water pipes without having to disturb the position of the pipe (e.g., in the ground or around other piping or equipment).

BRIEF DESCRIPTION OF THE DRAWINGS

The structure and operation of certain example embodiments is described with reference to the following accompanying drawings, in which like reference numerals refer to similar or like parts.

DESCRIPTION OF EXAMPLE EMBODIMENTS

The following description, in connection with the accompanying drawings, is intended as a description of various example embodiments, and is not intended to represent the only embodiments in which the disclosure may be practiced. The detailed description includes specific details for the purpose of providing a thorough understanding of the embodiments. However, it will be apparent to those skilled in the art that embodiments of the invention may be practiced without all of these specific details. In some instances, well-known structures and components are shown in simplified form for brevity of description. For clarity and ease of explanation, some surfaces and details may be omitted in the present description and figures. In addition, it should also be understood that the various components illustrated herein are not necessarily drawn to scale. In other words, the features disclosed in various embodiments may be implemented using different relative dimensions within and between components than those illustrated in the drawings.

It may be desired to install an insert or device (e.g., water-saving valves, variable flow adjustable valves, smart valves, flow-measuring devices, etc.) at a water pipe. The insert or device may include receptacles (e.g., threaded female receptacles) on opposite sides (e.g., in and out) into which cut pipe ends may be inserted, for example, via an appropriate port adapter (e.g., having threaded male portion). In order to reduce or prevent leakage from the connection, the port adapter may need to be pushed onto or into the cut pipe portion and sealed with, for example, PVC glue. However, this may be difficult to accomplish if there is limited space around the cut pipe or if it is necessary to misalign pipe ends to assemble typical couplings.

FIGS. 1-6 illustrate certain exemplary embodiments of a coupling assembly including a port adapter, and a method of installing the coupling assembly onto an existing pipe. The disclosed examples of FIGS. 1-6 are designed to permit installing a threaded port adapter with a seal onto a cut pipe with minimal disturbance to the position of the pipe. Furthermore, the exemplary coupling examples may be dismantled and assembled over a cut pipe with a reduced gap, reducing or eliminating a need to move one of the connecting pipe ends out of alignment in order to connect a coupling during installation.

Figure 1:
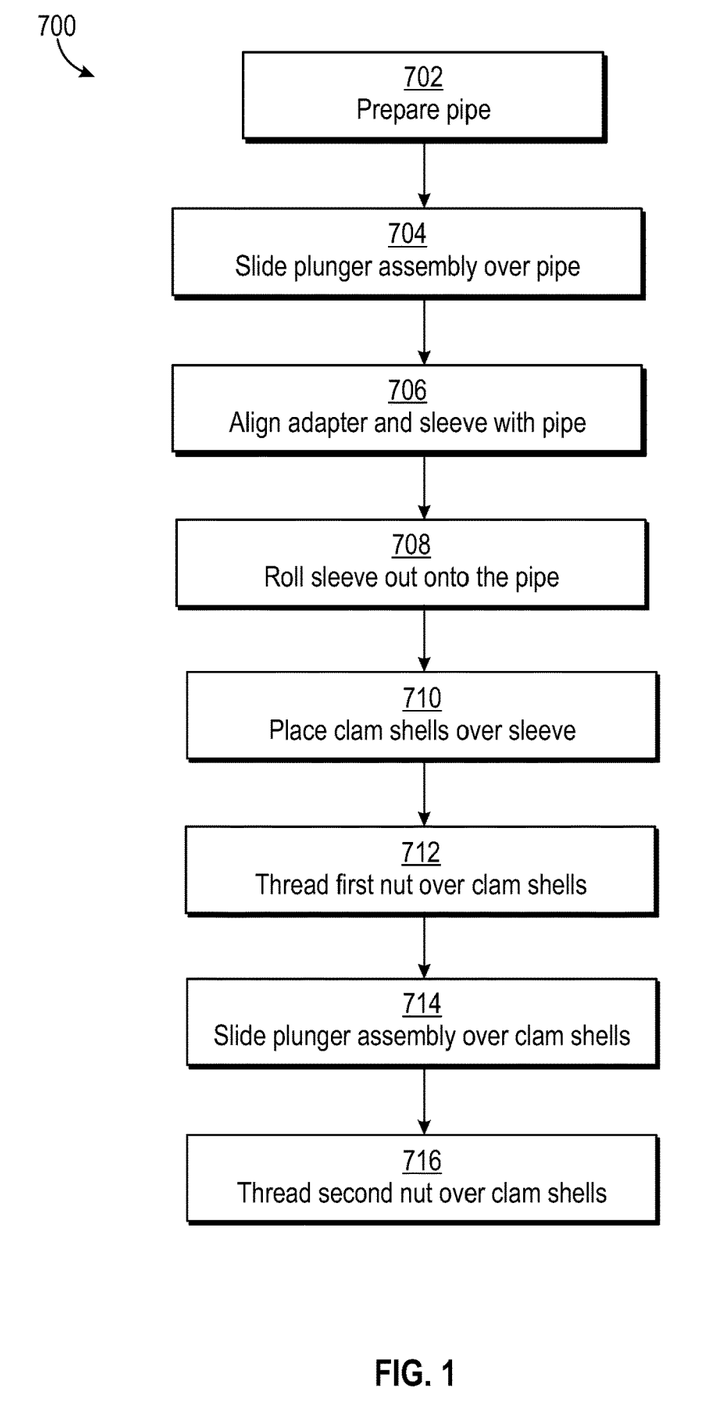
FIG. 1 is a flow chart of a process of installing an adapter onto a water pipe, according to an example embodiment.
Figure 2:
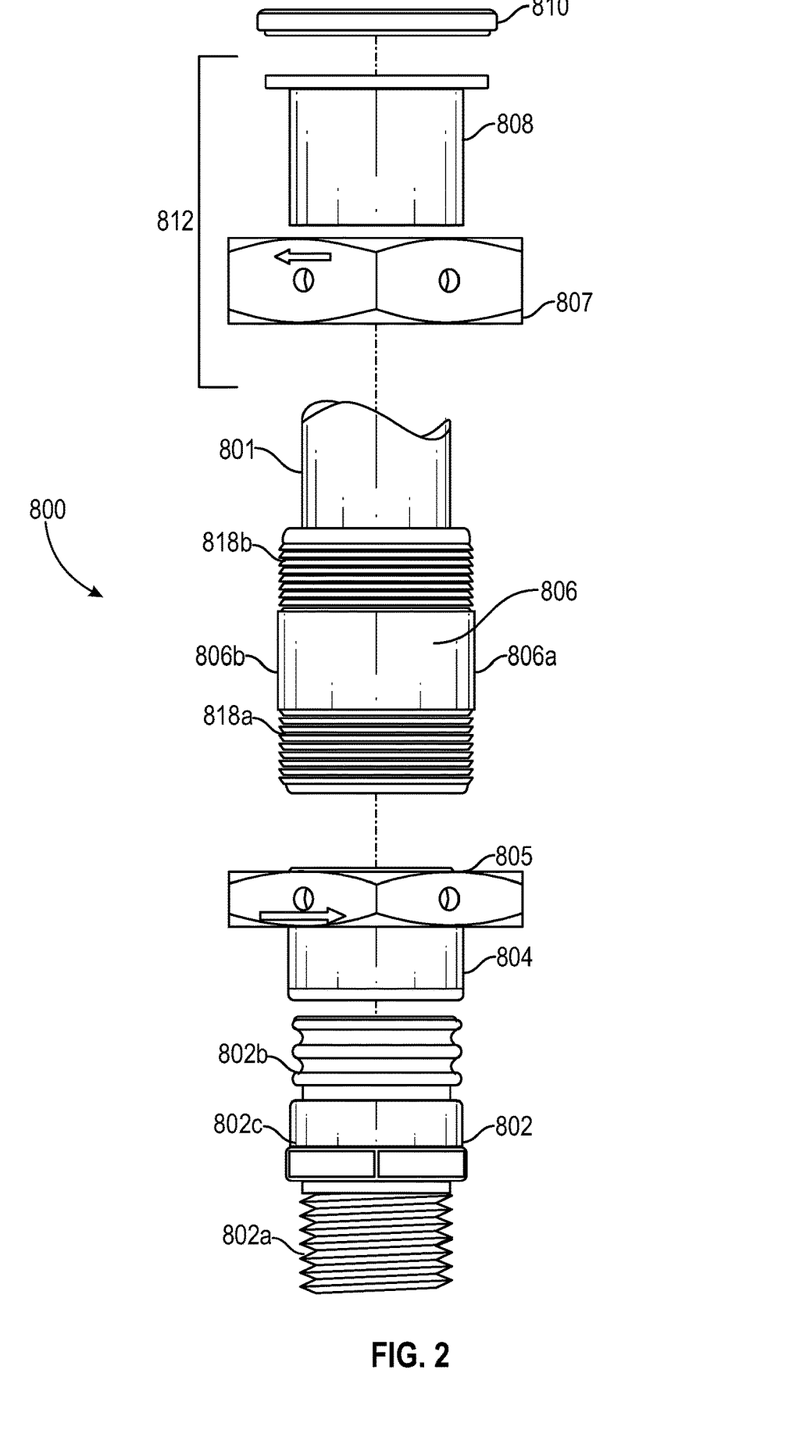
FIG. 2 shows a disassembled side view of a coupling assembly, according to an example embodiment.
Figure 3:
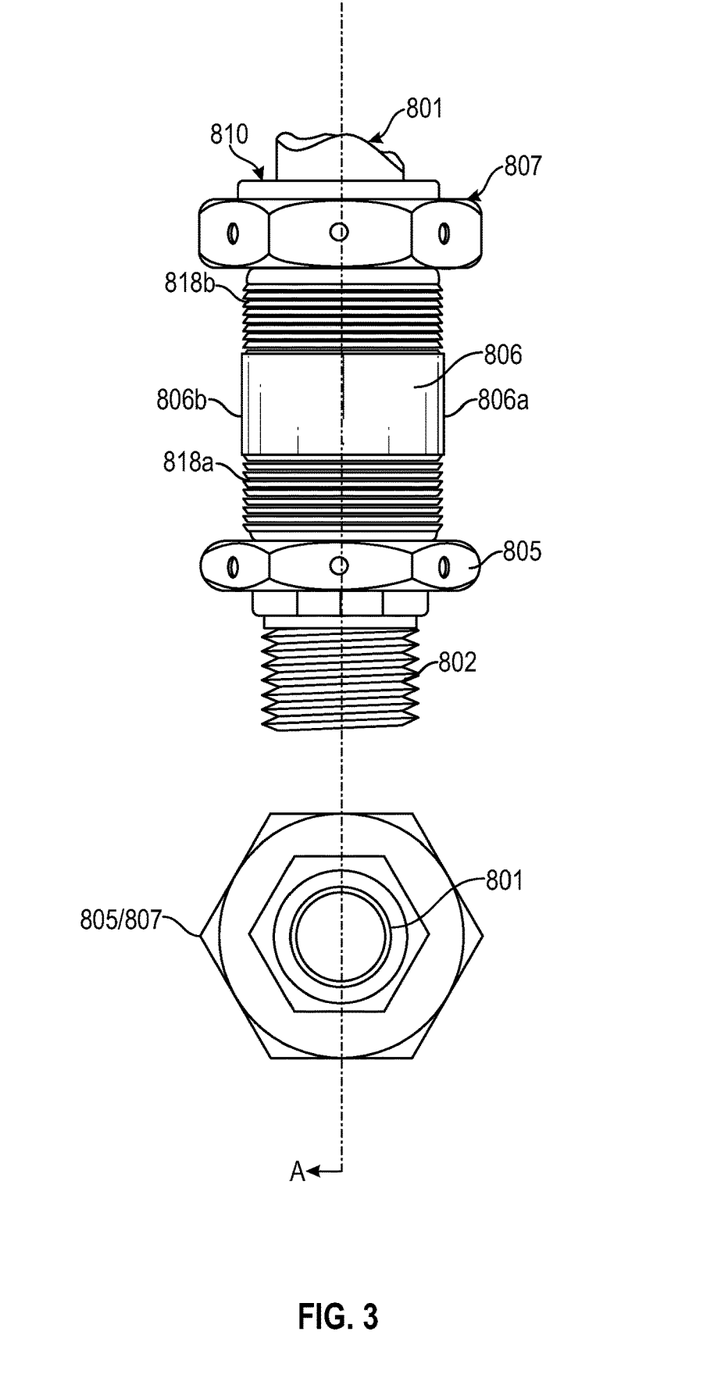
FIG. 3 shows an assembled side view of the coupling assembly of FIG. 2.
Figure 4:
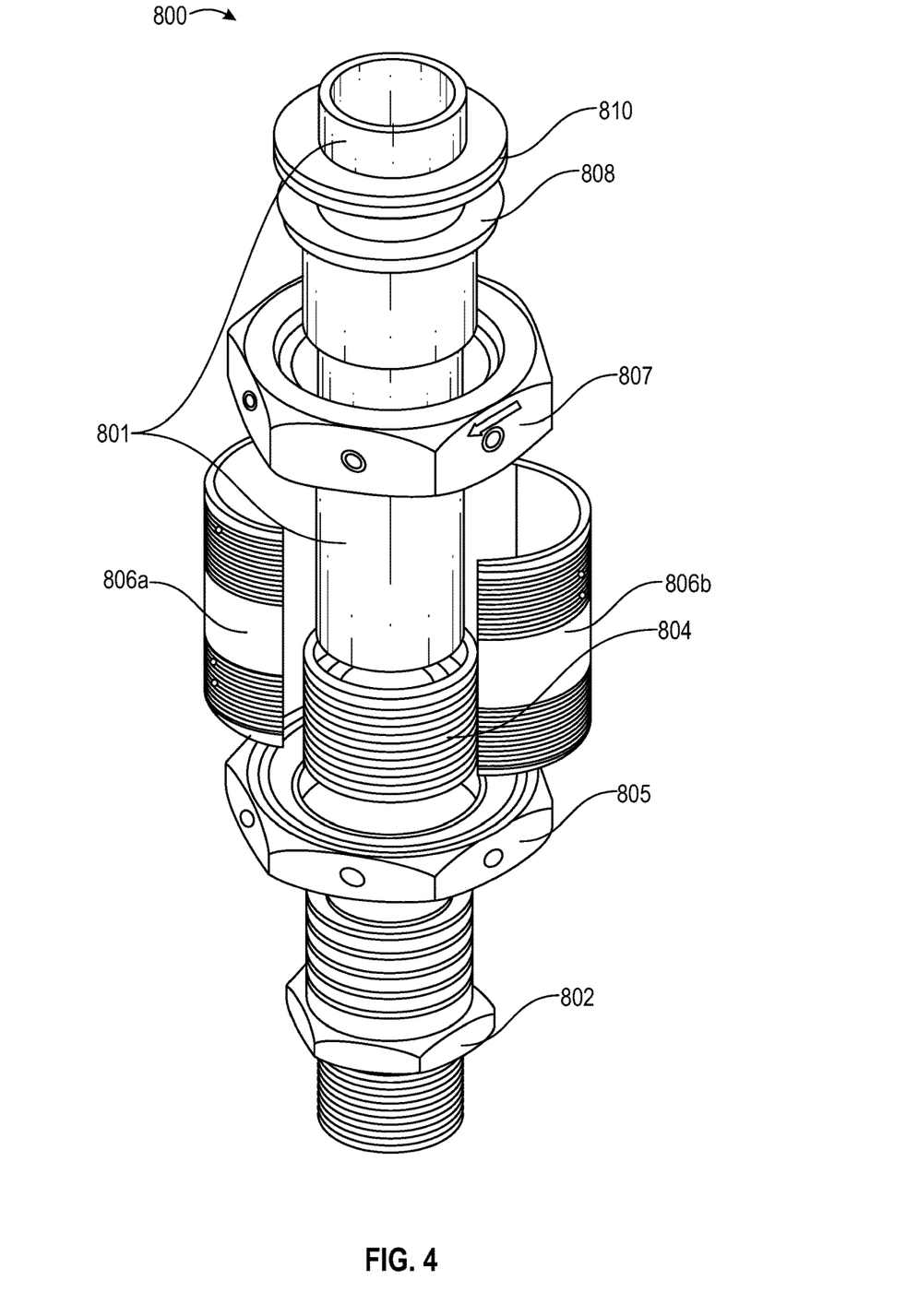
FIG. 4 shows an exploded view of the coupling assembly of FIG. 3.
Figure 5:
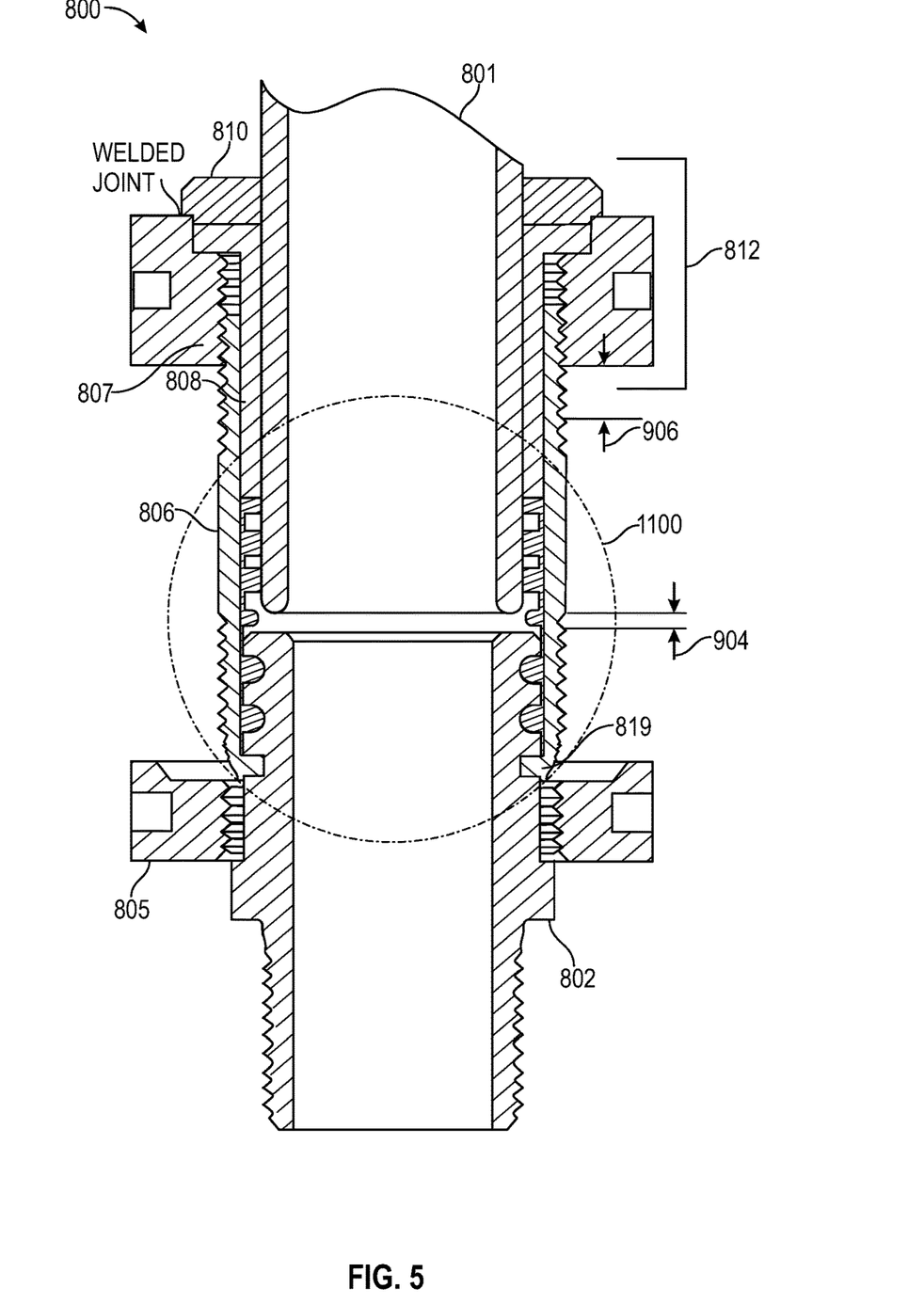
FIG. 5 shows a cross-sectional view of the coupling assembly of FIG. 3, the cross-sectional plane being identified as A-A in FIG. 3.
Figure 6:
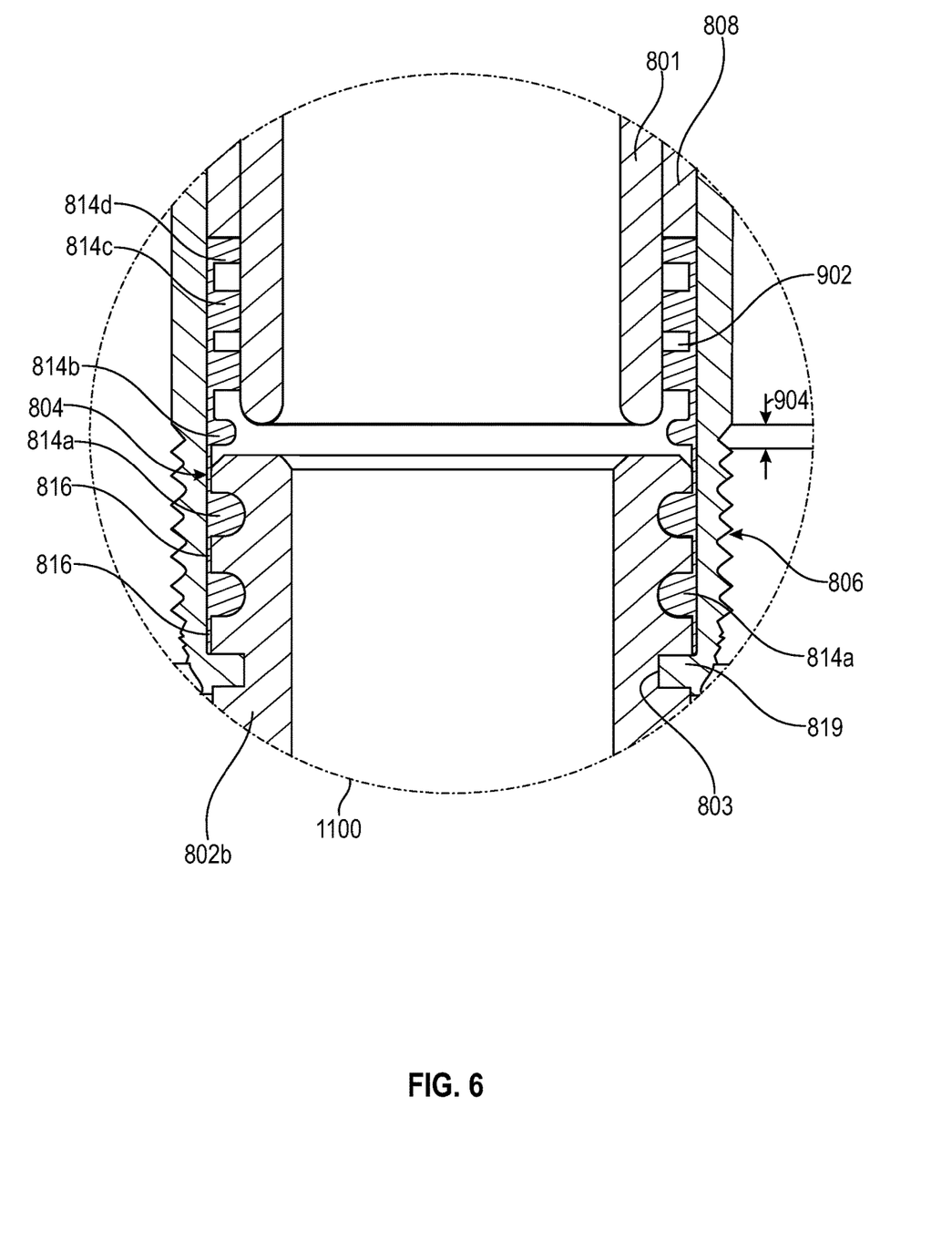
FIG. 6 shows a close-up 1100 of the cross-section shown in FIG. 5.

FIG. 1 is a flow chart of an example process 700 of installing a coupling assembly 800, including a port adapter 802, onto a cut pipe 801, according to an embodiment. FIGS. 2-6 illustrate a coupling assembly 800 and a portion of the cut pipe 801 that may be used in the process 700 of FIG. 1. FIG. 2 shows a disassembled side view of the coupling assembly 800. FIG. 3 shows a coupling assembly 800 fitted over the pipe 801 and in the process of being assembled. FIG. 4 shows an exploded view of the coupling assembly 800 and the pipe 801. Note that FIG. 4 is not an illustration of the coupling assembly 800 prior to installation. FIG. 5 shows a cross-section A-A of the coupling assembly 800 fitted over the pipe 801. FIG. 6 shows a close-up 1100 of the cross-section shown in FIG. 5.

The port adapter 802 may be a threaded port adapter and may be configured to match a receptacle of any device, including another adapter (e.g., for connection to an insert or device that does not have a matching port). It should be noted that the coupling assembly 800 is not limited for implementation with any particular device, but may be used to connect other types of devices to a cut pipe using a port adapter.

In one exemplary embodiment, the coupling assembly 800 may include a plurality of port adapters 802 (e.g., portion 802*a* having different diameters or threading) configured to match different devices, such that a particular port adapter 802 would have to be selected, as appropriate.

As shown in one or more of FIGS. 2-6, the coupling or coupling assembly 800 may include the port adapter 802, a flexible sleeve 804, a first nut 805, a two-piece clam shell 806 (including first half 806*a* and second half 806*b*), and a plunger assembly 812 (including a second nut 807, a plunger 808, and a back plate 810). In an exemplary embodiment, the first nut 805 is a left hand (LH) threaded nut and the second nut 807 is a right hand (RH) threaded nut. In an alternate embodiment, the first nut 805 may be RH and the second nut 807 may be LH. In this context, a LH threaded nut or tube may tighten or advance when turned counterclockwise and a RH threaded nut or tube may tighten or advance when turned clockwise. In the foregoing sense, LH and RH threads, even if they have the same diameter and pitch, are considered to be oriented in the "opposite direction" rather than in the same direction, and so do not match and will not directly mate, while threads in the same direction and having approximately the same diameter and pitch are considered to match and may mate and correctly engage with each other.

The adapter 802 may include a threaded male portion 802a, for coupling to the insert or device, a grooved or ribbed portion 802b, for engaging the sleeve 804, and a middle or stem portion 802c. The stem portion 802c may include an additional groove 803 for engaging the claim shell 806.

The sleeve 804 may be a flexible, internally ribbed sleeve, for example, a flexible rubber or polymer such as neoprene. The sleeve may include a plurality of annular ribs 814a-d connected by thinner membranes 816 of the same material that space apart the ribs to form annular ruts therebetween. The spacing and sizes (i.e., cross-sectional shapes) of the ribs may be configured to match other parts of the coupling assembly 800. The annular ribs 814a-d may have different rib cross-sectional shapes or areas (for example, with one or more ribs 814b, 814d having smaller cross-section than one or more other ribs 814a, 814c) and the annular ruts formed by the membranes 816 between ribs may have different widths, as shown in FIGS. 5-6. The ribs may be O-ring style ribs (i.e., with approximately circular cross-sections), e.g., as shown in FIGS. 5-6 or, alternatively, the ribs may have rectangular or square cross sections.

In an exemplary embodiment, the sleeve 804 may include first rib sections 814a that are fitted into corresponding grooves of the grooved portion 802b of the port adapter 802. The sleeve 804 may include second, third, and fourth rib sections 814b-d that are configured to be rolled out from the adapter 802. For example, in the embodiments of FIGS. 5-6, third and fourth rib sections 814c-d are rolled onto the cut pipe 801 while second ribs section 814b corresponds to a gap 904 between the pipe 801 and the adapter 802. The thinner membranes 816 of the sleeve 804 are sized such that the ribs are correctly placed when the sleeve is rolled out.

In an exemplary embodiment, the sleeve 804 is rolled up onto itself before installation. In one example, a first portion of the sleeve 804, including the first rib portions 814a, is fitted into the grooves of the adapter 802, and the rest of the sleeve 804 (including 814b-d) is rolled out over the top of the pipe 801.

The two-piece clam shell 806 (including a first half 806a and a second half 806b) may have a first threaded portion 818a that is configured to engage the first nut 805 and an opposite, second threaded portion 818b that is configured to engage the second nut 807, for example by having matching thread pitch. FIG. 3 shows the clam shell 806 in the closed position while the exploded view of the coupling assembly 800 in FIG. 4 shows the two separate halves 806a, 806b of the clam shell 806. As shown in the example embodiment of FIG. 6, the clam shell 806 (including halves 806a and 806b) may also include an internal rib 819 which corresponds to a groove 803 on the adapter 802 and which may be used during assembly to correctly position the clam shell along the adapter 802.

Although the plunger back plate 810 and the second nut 807 of the plunger assembly 812 are shown as separate pieces in the exploded view of FIG. 4, the plunger assembly 812 may be pre-assembled by the manufacturer such that the second nut 807 is solidly connected to the back plate 810, as shown in FIG. 5. Although FIG. 5 indicates that such a solid connection may be accomplished by welding, other conventional methods of solidly connecting the parts are contemplated herein. The plunger 808 is preferably contained but not welded to either the second nut 807 or the back plate 810. For example, when the nut 807 is installed over the clam shell and aligned to engage the clam shell threads 818b, the plunger 808 may preferably be only loosely constrained and does not necessarily rotate with the nut. Hence, the plunger 808 moves along the axis of the assembly (i.e., along the pipe) but does not necessarily rotate with the nut 807. This advantageously reduces torsional loads on the sleeve 804 that would cause wrinkles or flow paths in its compressed condition.

FIG. 1 shows a process 700 of installing the coupling assembly 800 of FIGS. 2-6.

In step 702, the pipe 801 is prepared (e.g., cut, sawed, etc.) for installation of the coupling assembly 800. In one embodiment, a section of a water pipe may be removed to precisely accommodate a width of the coupling and the device to be installed. For example, the length of the removed pipe section may be very close to the width of the device having the adapter screwed into it. In certain embodiments, the length of the pipe section may be obtained from a template or instructions provided with the coupling assembly 800 on how to calculate the length (e.g., with a given device). Note that the process 700 of installing the coupling assembly 800 described in FIG. 1 is applied to one half of the cut pipe. However, the same (or mirrored) process may be applied to the other half of the cut pipe, with another coupling assembly 800.

Further note some of the sizing and dimensions of the coupling assembly 800 may be determined by the dimensions of the pipe 801 (e.g., the coupling needs to fit to the outer diameter of the pipe). As such, prior to installation, a coupling assembly 800 having the appropriate size may need to be specified or selected.

In step 704, the plunger assembly 812 slides over the pipe 801 (e.g., long enough to align with the pipe).

In step 706, the adapter 802 connected to the sleeve 804 (with the first nut 805 placed over the adapter) are aligned to the pipe 801. In one embodiment, in step 706, the sleeve 804 is secured to the adapter 802 by stretching the sleeve over the ribbed or grooved portion 802b, such that the ribs 814a of the sleeve are fitted into the grooves of the adapter 802 (see FIG. 6). In another embodiment, the sleeve 804 may be pre-installed onto the adapter 802 by the manufacturer of the coupling assembly 800. The first nut 805 is placed over the middle section 802c of the adapter 802 so that it does not impede the sleeve 804 stretched over the grooved portion 802b of the adapter 802 in the next step 708. In an exemplary embodiment, prior to aligning the adapter 802 to the pipe 801, the adapter 802 is connected to the insert or device. In an alternate embodiment, the insert or device is connected to the adapter 802 at a later stage of the installation (e.g., after the entire coupling assembly 800 is installed).

In step 708, the sleeve 804 is rolled onto the pipe 801 from the adapter 802. The ribs of the sleeve over the pipe are spaced apart by the thinner membranes 816 of the sleeve that form annular ruts 902 between the ribs (see FIG. 6). The ribs' diameters are designed to expand when rolled onto the pipe much like a rubber band would. Rolling the sleeve 804 over the cut pipe 801 rather than sliding it makes installation somewhat easier. The ribs may be spaced on the sleeve such that, when the sleeve 804 is rolled out, a smaller rib 814b falls into the gap 904 between the pipe 801 and the adapter 802.

In step 710, the clam shell 806 (both first 806a and second 806b shell halves) are placed over the sleeve 804, including the portion of the sleeve placed over the adapter 802 and the portion of the sleeve placed over the pipe 801. The internal rib 819 of the clam shell 806 mates or otherwise couples to the groove 803 of the adapter stem section 802c, so that the clam shell halves 806a, 806b are properly aligned to each other and the adapter 802 (as shown in FIGS. 5-6).

In step 712, the first nut 805 is threaded over the corresponding portion 818a of the clam shell 806 in order to lock the sleeve 804 and clam shell 806 into place with some squeeze.

In step 714, the plunger assembly 812 slides down from the pipe 801. The second nut 807 slides over the clam shell 806 while the plunger 808 fits underneath the clam shell 806, as shown in FIG. 5.

In step 716, the second nut 807 is threaded over the clam shell 806 (e.g., over corresponding portion 818b) and tightened. The second nut 807 may be tightened with a spanner wrench. In addition, the first 805 and second 807 nuts may be tightened simultaneously, since they have opposite threading. The oppositely threaded nuts 805, 807 allow a user to compress the sleeve 804 while reducing any torque on the inserted device or pipe.

As the second nut 807 is tightened over the clam shell 806, the entire plunger assembly 812 (including 807, 808, 810) travels an available distance 906 (see, e.g., FIG. 5) in the direction of the gap 904 between the pipe 801 and the adapter 802. The plunger 808 contacts the end of the sleeve 804 and, as the second nut 807 is tightened, it compresses the sleeve 804 along an axial direction of the pipe 801, so that the ribs 814c-814d are pushed towards one another. The annular ruts 902 between the ribs 814c, 814d are at least partially closed and the thinner membranes 816 of the sleeve are folded or buckled in. The available travel distance 906 may be configured such that the sleeve 804 is squeezed tight enough to seal against specific water pressures (e.g., up to 150 PSI) and such that a small gap 904 (e.g., around 0.1 inches) is formed between the pipe 801 and the adapter 802. The compression forces are absorbed in the clam shell 806 and not the pipe. The different sizes of the ribs 814c, 814d provides some direction for the membranes 816 to fold up or down in the spaces keeping some uniformity in packing the ribs (e.g., between the pipe 801 and rib(s) 814d), filling the gap 904 between the cut pipe and the adapter (i.e., with small rib 814b), and keeping larger ribs on the pipe for sealing as they are compressed.

In an exemplary embodiment, the installation of the coupling assembly 800 over the cut water pipe 801 does not require glue or threading of the pipe. While process 700 is illustrated with a certain arrangement and ordering of subprocesses, process 700 may be implemented with fewer, more, or different subprocesses and a different arrangement or ordering of subprocesses. It should be understood that any subprocess, which does not depend on the completion of another subprocess, may be executed before, after, or in parallel with that other independent subprocess, even if the subprocesses are described or illustrated in a particular order.

While the processes, described herein, are illustrated with a certain arrangement and ordering of subprocesses, each process may be implemented with fewer, more, or different subprocesses and a different arrangement or ordering of subprocesses. In addition, it should be understood that any subprocess, which does not depend on the completion of another subprocess, may be executed before, after, or in parallel with that other independent subprocess, even if the subprocesses are described or illustrated in a particular order.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method of retrofitting a device on to a cut pipe, the method comprising:
    aligning a port adapter with the cut pipe, the port adapter connected to a first portion of an internally ribbed flexible sleeve, wherein a second portion of the internally ribbed flexible sleeve is rolled up over the first portion;
    rolling the second portion of the internally ribbed flexible sleeve from the port adapter onto the cut pipe;
    placing a two-piece clam shell over the internally ribbed flexible sleeve, wherein the two-piece clam shell includes a first threaded region and a second threaded region, wherein the first threaded region is threaded in the opposite direction from the second threaded region;
    prior to aligning the port adapter with the cut pipe, sliding a first nut onto the port adapter; and
    prior to rolling the second portion of the internally ribbed flexible sleeve onto the cut pipe, sliding a plunger assembly onto the cut pipe.

2. The method of claim 1, wherein the plunger assembly comprises a second nut and a tubular plunger.

3. The method of claim 2, further comprising tightening the first nut over the first threaded region and tightening the second nut over the second threaded region.

4. The method of claim 3, wherein the first nut is left-handed threaded and the second nut is right-hand threaded.

5. The method of claim 3, wherein tightening the second nut over the second threaded region moves the plunger assembly towards the port adapter.

6. The method of claim 5, wherein moving the plunger assembly towards the port adapter compresses the second portion of the internally ribbed flexible sleeve along an axial direction of the cut pipe.

7. The method of claim 6, wherein the second portion of the internally ribbed flexible sleeve comprises a plurality of annular ribs spaced apart by at least one annular rut and interconnected by at least one membrane, and wherein rolling the second portion of the internally ribbed flexible sleeve from the port adapter onto the cut pipe comprises disposing the at least one annular rut along the cut pipe.

8. The method of claim 7, wherein compressing the second portion of the internally ribbed flexible sleeve comprises pushing the plurality of annular ribs together to at least partially close the at least one annular rut.

9. The method of claim 8, wherein the plurality of annular ribs are pushed together by the tubular plunger as the plunger assembly moves towards the port adapter.

\* \* \* \* \*